United States Patent
Suto et al.

(10) Patent No.: US 12,544,910 B2
(45) Date of Patent: Feb. 10, 2026

(54) BELT TRANSMISSION MECHANISM AND TRANSFER ROBOT INCLUDING THE SAME

(71) Applicant: DAIHEN Corporation, Osaka (JP)

(72) Inventors: Yoshihiro Suto, Osaka (JP); Takaya Yamada, Osaka (JP)

(73) Assignee: DAIHEN Corporation, Osaka (JP)

( * ) Notice: Subject to any disclaimer, the term of this patent is extended or adjusted under 35 U.S.C. 154(b) by 0 days.

(21) Appl. No.: 18/974,340

(22) Filed: Dec. 9, 2024

(65) Prior Publication Data
US 2025/0205875 A1    Jun. 26, 2025

(30) Foreign Application Priority Data
Dec. 22, 2023   (JP) .................................. 2023-216730

(51) Int. Cl.
*B25J 9/10*    (2006.01)
*F16H 19/08*   (2006.01)

(52) U.S. Cl.
CPC .............. *B25J 9/104* (2013.01); *F16H 19/08* (2013.01); *F16H 2019/085* (2013.01)

(58) Field of Classification Search
CPC ........................... B25J 9/104; F16H 2019/085
See application file for complete search history.

(56) References Cited

U.S. PATENT DOCUMENTS

| | | | |
|---|---|---|---|
| 11,235,935 B2* | 2/2022 | Babbs | ............... H01L 21/68707 |
| 12,162,698 B2* | 12/2024 | Babbs | ............... H01L 21/67196 |

FOREIGN PATENT DOCUMENTS

JP    2008-223974    9/2008

* cited by examiner

*Primary Examiner* — Jake Cook
(74) *Attorney, Agent, or Firm* — HSML P.C.

(57) ABSTRACT

A belt transmission mechanism includes two pulleys, first/second steel belts, and first/second covers. Each pulley includes first/second recesses recessed from the outer circumferential surface of the pulley. The first steel belt has an end fixed to a first block member disposed in the first recess. The first cover, fixed to the first recess to enclose the first block member, has an outer circumferential surface having the same diameter as the outer circumferential surface of the pulley. The second steel belt has an end fixed to a second block member disposed in the second recess. The second cover, fixed to the second recess to enclose the second block member, has an outer circumferential surface having the same diameter as the outer circumferential surface of the pulley.

4 Claims, 6 Drawing Sheets

BELT TRANSMISSION MECHANISM AND TRANSFER ROBOT INCLUDING THE SAME

FIELD

The present disclosure relates to a belt transmission mechanism and a transfer robot including the belt transmission mechanism.

BACKGROUND

Some transfer robots include a horizontal articulated arm mechanism. An example of such a transfer robot is disclosed in JP-A-2008-223974. The transfer robot includes arms rotatably attached to each other and a hand section rotatably attached to the end of one arm. The arms and the hand section are rotationally driven by a belt transmission system. In the above document, metallic steel belts are used for the belt transmission system. Steel belts emit less dust and outgas compared with timing belts made of rubber or other belts, and a belt transmission system that uses steel belts is suitable for use in a transfer robot that is placed in vacuum environments.

The belt transmission system disclosed in the above document has two steel belts for two pulleys (a drive pulley and a driven pulley). The two steel belts are each a belt with two ends, rather than an endless belt. The two steel belts are attached to the two pulleys at different heights in the vertical direction (see FIG. 1 of the above document). The two steel belts are attached to the two pulleys with the winding directions opposite to each other (see FIG. 2 of the above document). Attaching the two belts in such a manner enables the pulleys to rotate in opposite directions around their axes. The two ends of each steel belt are fastened along the outer circumferential surface of the pulleys with press-fit pins, screws or the like. The belt transmission system in which the two ends of a belt are fastened to pulleys provides better positioning accuracy compared with a system using an endless belt and suppresses misalignment with the pulleys.

In the conventional belt transmission mechanism described above, however, the steel belts (each having two ends) cannot be placed to overlap with each other on the outer circumference of a pulley, which limits the rotation angle of the pulleys. Further, each belt wound around the pulleys needs to avoid interference with the portions where the ends of the belt are fastened, which further limits the rotation angle of the pulley.

SUMMARY

In light of the above circumstances, an object of the present disclosure is to provide a configuration capable of increasing the rotation angle of pulleys in a belt transmission mechanism, where the belt transmission mechanism includes two steel belts attached to two pulleys with the winding directions opposite to each other.

To solve the above issues, the present disclosure takes the following technical measures.

A belt transmission mechanism provided according to a first aspect of the present disclosure includes: a first pulley and a second pulley disposed rotatably about a pair of axes that are parallel to each other; a first steel belt including a first end attached to the first pulley and a second end attached to the second pulley and wound around the first pulley and the second pulley; a second steel belt including a third end attached to the first pulley and a fourth end attached to the second pulley, while being spaced apart from the first steel belt in an axial direction of the first pulley and the second pulley, and wound around the first pulley and the second pulley with a winding direction thereof opposite from a winding direction of the first steel belt; a first cover; and a second cover. The first pulley includes a first recess and a second recess that are recessed from its outer circumferential surface. A first block member is fixed to the first end, and the first block member is disposed in the first recess. The first cover is fixed to the first recess to enclose the first block member and includes a first outer circumferential surface having the same diameter as the outer circumferential surface of the first pulley. A second block member is fixed to the third end, and the second block member is disposed in the second recess. The second cover is fixed to the second recess to enclose the second block member and includes a second outer circumferential surface having the same diameter as the outer circumferential surface of the first pulley.

In a preferred embodiment, the belt transmission mechanism further includes a third cover and a fourth cover. The second pulley includes a third recess and a fourth recess that are recessed from its outer circumferential surface. A third block member is fixed to the second end, and the third block member is disposed in the third recess. The third cover is fixed to the third recess to enclose the third block member and includes a third outer circumferential surface having the same diameter as the outer circumferential surface of the second pulley. A fourth block member is fixed to the fourth end, and the fourth block member is disposed in the fourth recess. The fourth cover is fixed to the fourth recess to enclose the fourth block member and includes a fourth outer circumferential surface having the same diameter as the outer circumferential surface of the second pulley.

In a preferred embodiment, at least one of the first cover and the second cover is provided with a belt tension adjuster capable of pushing a corresponding one of the first block member and the second block member toward the circumference of the first pulley.

In a preferred embodiment, the first recess includes a first guide surface that is in contact with the first steel belt and connected smoothly to the outer circumferential surface of the first pulley. The second recess includes a second guide surface that is in contact with the second steel belt and connected smoothly to the outer circumferential surface of the first pulley.

A transfer robot provided according to a second aspect of the present disclosure includes the belt transmission mechanism provided according to the first aspect of the present disclosure and a horizontal articulated arm mechanism including an arm configured to be pivoted by the belt transmission mechanism.

The belt transmission mechanism according to the present disclosure makes it possible to wind the first steel belt to make almost a full turn (approximately 360°) in the circumferential direction of the first pulley over the outer circumferential surface of the first pulley and the first outer circumferential surface of the first cover. Further, the belt transmission mechanism makes it possible to wind the second steel belt to make almost a full turn (approximately 360°) in the circumferential direction of the first pulley over the outer circumferential surface of the first pulley and the second outer circumferential surface of the second cover. Thus, the rotation angle of the first pulley can be increased.

DRAWINGS

EMBODIMENTS

Figure 1:
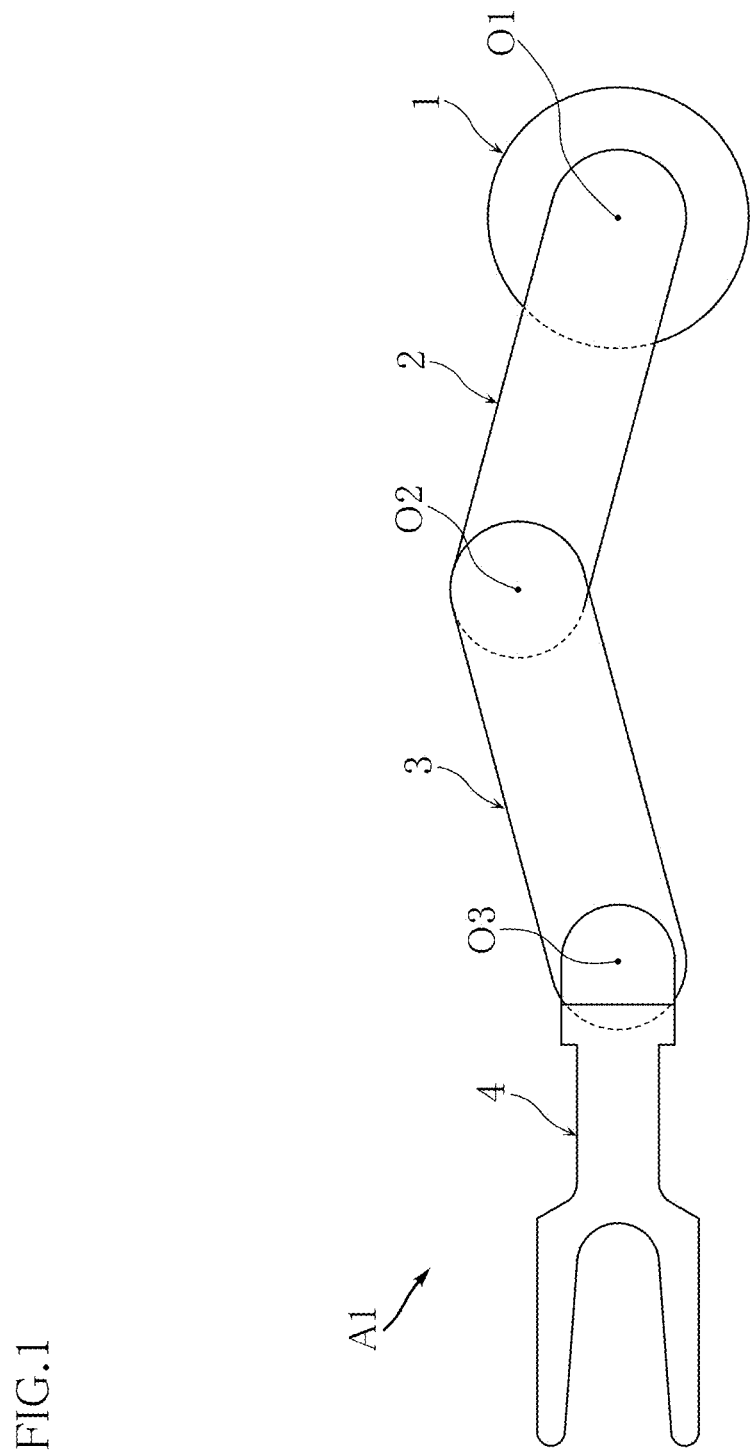
FIG. 1 is a plan view showing an example of a transfer robot including a belt transmission mechanism according to the present disclosure.

Preferred embodiments of the present disclosure will be described below with reference to the drawings.

In the present disclosure, the terms such as "first" and "second" are used merely as labels and are not intended to impose ordinal requirements on the items to which these terms refer.

FIGS. 1 to 7 show an example of a transfer robot including a belt transmission mechanism according to the present disclosure. The transfer robot A1 of the present embodiment may be used to transfer a workpiece (not shown) in the form of a thin plate, such as a circular silicon wafer. The transfer robot A1 includes a support member 1, a first arm 2, a second arm 3, a hand 4, first pulleys 6A, 6C and 6E, second pulleys 6B, 6D and 6F, first steel belts 71, second steel belts 72, first block members 81, second block members 82, third block members 83, fourth block members 84, first covers 91, second covers 92, third covers 93, and fourth covers 94.

The support member 1 is supported by a moving mechanism, not shown, and can move in a predetermined vertical in-plane direction. The moving mechanism is not limited to a particular configuration, and may include, for example, a vertical articulated arm mechanism or a slider unit capable of moving linearly in the horizontal direction.

Figure 2:
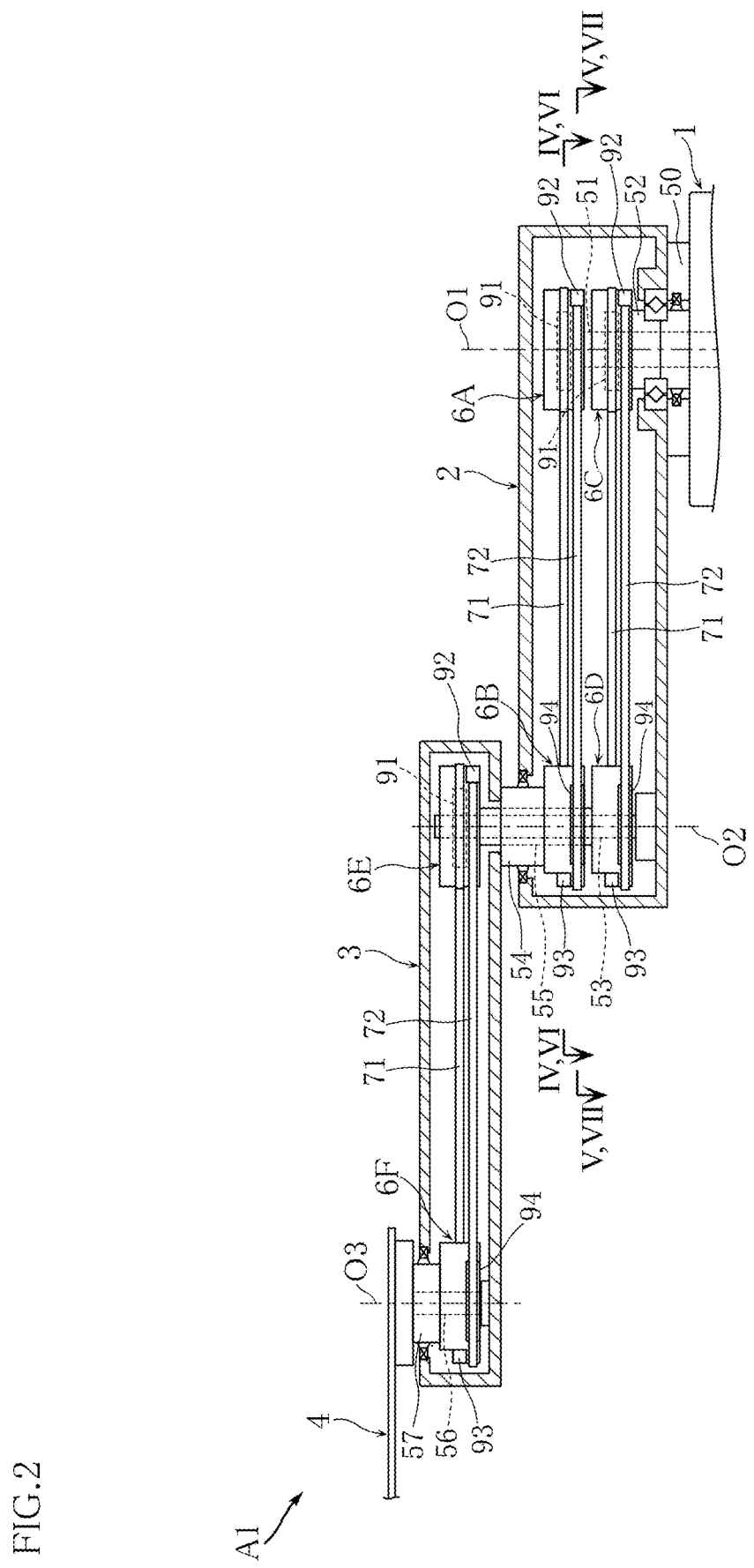
FIG. 2 is a longitudinal sectional view showing the schematic structure of the transfer robot shown in FIG. 1.

As shown in FIG. 2, the first arm 2 and the second arm 3 are supported by the support member 1 and constitute a horizontal articulated arm mechanism that moves within a horizontal plane. The first arm 2 is supported, at its base end (the right end in FIG. 2), on the support member 1 to be pivotable about the first axis O1 extending in the vertical direction. The bottom wall of the first arm 2 at the base end is formed with an opening. A cylindrical pivot shaft 50 is connected to the first arm 2 to extend downward from around the opening. Although detailed illustration or description is omitted, a drive source (such as a motor) for pivoting the first arm 2 is disposed inside the support member 1, and the drive source causes the first arm 2 to pivot about the first axis O1 via the pivot shaft 50. Also, a rotation shaft 51 and a rotation shaft 52, which extend upward from the support member 1 side, are inserted into the above opening in the bottom wall. The rotation shaft 52 is fitted around the rotation shaft 51. A bearing, not shown, is interposed between the rotation shaft 51 and the rotation shaft 52. The rotation shaft 51 and the rotation shaft 52 are rotatable about the first axis O1.

The top wall of the first arm 2 at the distal end (the left end in FIG. 2) is formed with an opening. A fixed shaft 53 is provided on the bottom wall of the first arm 2 at the distal end. The fixed shaft 53 has the second axis O2 extending in the vertical direction as its central axis, and extends upward through the above opening in the top wall.

The second arm 3 is supported on the first arm 2. The bottom wall of the second arm 3 at the base end (the right end in FIG. 2) is formed with an opening. A cylindrical pivot shaft 54 is connected to the second arm 3 to extend downward from around the opening. The pivot shaft 54 is fitted around a rotation shaft 55, and the rotation shaft 55 is fitted around the fixed shaft 53. Bearings, not shown, are interposed between the fixed shaft 53 and the rotation shaft 55 and between the rotation shaft 55 and the pivot shaft 54. Thus, the pivot shaft 54 is pivotable about the second axis O2. In this way, the second arm 3 is supported on the distal end (the left end in FIG. 2) of the first arm 2 to be pivotable about the second axis O2 extending in the vertical direction. The fixed shaft 53, which is provided at the distal end of the first arm 2, extends through the opening in the bottom wall of the second arm 3 into the second arm 3.

The top wall of the second arm 3 at the distal end (the left end in FIG. 2) s formed with an opening. A fixed shaft 56 is provided on the bottom wall of the second arm 3 at the distal end. The fixed shaft 56 has the third axis O3 extending in the vertical direction as its central axis, and extends upward through the above opening in the top wall.

As shown in FIG. 1, the hand 4 has a fork-shaped distal end branched into two parts and is supported on the second arm 3 in a horizontal posture. The hand 4 is used to place and hold a workpiece (not shown) in the form of a thin plate, such as a circular silicon wafer, for example. As shown in FIG. 2, a pivot shaft 57 is connected to the base end (the right end in FIG. 2) of the hand 4 to extend downward. The pivot shaft 57 is fitted around the fixed shaft 56 provided at the distal end of the second arm 3, and a bearing, not shown, is interposed between the fixed shaft 56 and the pivot shaft 57. In this way, the hand 4 is supported on the distal end of the second arm 3 to be pivotable about the third axis O3 extending in the vertical direction.

The first pulleys 6A, 6C and 6E, the second pulleys 6B, 6D and 6F, the first steel belts 71, and the second steel belts 72 drive the pivotal movement of the second arm 3 (pivot shaft 54) and the hand 4 (pivot shaft 57). As will be described later, the first steel belts 71 and the second steel belts 72 are in the form of thin strips made of a metal and attached to the first pulleys 6A, 6C and 6E and the second pulleys 6B, 6D and 6F. The first block members 81 and the third block members 83 are attached to the first steel belts 71, and the second block members 82 and the fourth block members 84 are attached to the second steel belts 72 (see FIG. 3). The first covers 91 and the second covers 92 are attached to the first pulleys 6A, 6C and 6E, and the third covers 93 and the fourth covers 94 are attached to the second pulleys 6B, 6D and 6F. The first pulleys 6A, 6C and 6E, the second pulleys 6B, 6D and 6F, the first steel belts 71, the second steel belts 72, the first block members 81, the second block members 82, the third block members 83, the fourth block members 84, the first covers 91, the second covers 92, the third covers 93, and the fourth covers 94 constitute the belt transmission mechanism of the present disclosure.

Figure 3:
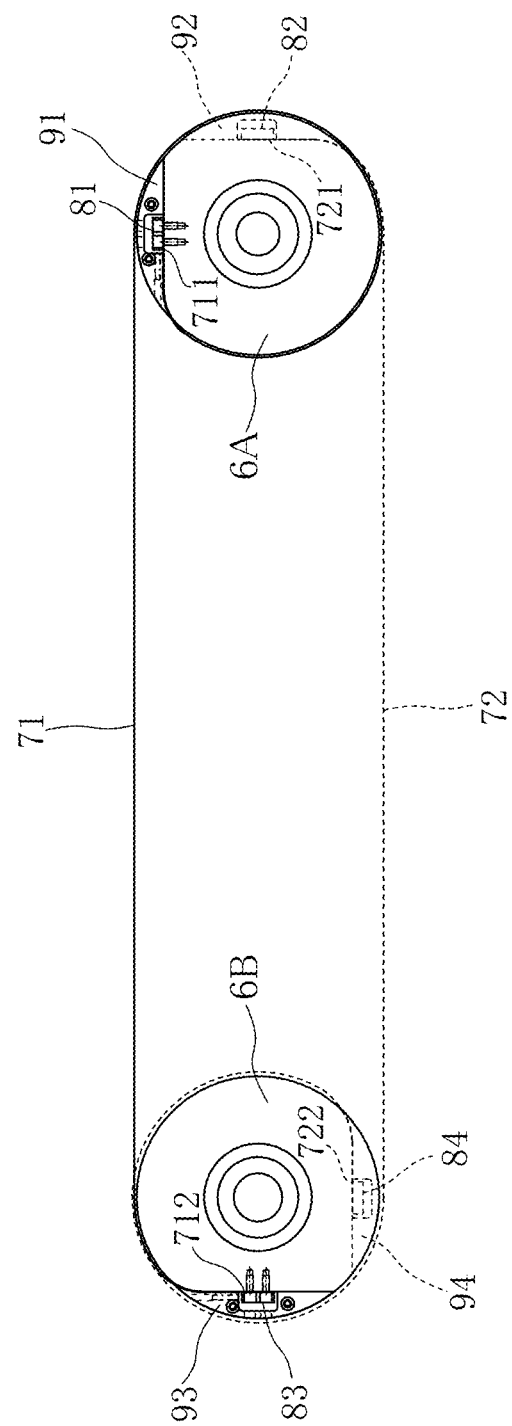
FIG. 3 is a plan view showing the schematic structure of an example of a belt transmission mechanism.

As shown in FIG. 2, the first pulley 6A is connected to the upper end of the rotation shaft 51 and is rotatable about the first axis O1. The second pulley 6B is connected to the lower end of the pivot shaft 54 and fitted around the rotation shaft 55, and is rotatable about the second axis O2. The first steel belts 71 and the second steel belts 72 are each a belt with two ends. One of the first steel belts 71 and one of the second steel belts 72 are wound around the first pulley 6A and the second pulley 6B. The second steel belt 72 is spaced apart from the first steel belt 71 in the axial direction (the vertical direction) of the first pulley 6A and the second pulley 6B. In the illustrated example, the second steel belt 72 is located below the first steel belt 71. As shown in FIG. 3, the second steel belt 72 is wound around the first pulley 6A and the second pulley 6B with its winding direction opposite from that of the first steel belt 71. In FIG. 3, the second steel belt 72 is shown by a dotted line to be distinguishable from the first steel belt 71. When the rotation shaft 51 is rotated, the first pulley 6A, and the second pulley 6B, which is linked to the first pulley 6A via the first and the second steel belts 71 and 72, rotate. As a result, the second arm 3, which is connected to the second pulley 6B via the pivot shaft 54, pivots about the second axis O2.

As shown in FIG. 2, the first pulley 6C is connected to the upper end of the rotation shaft 52 and is rotatable about the first axis O1. The second pulley 6D is connected to the lower end of the rotation shaft 55 and fitted around the fixed shaft 53, and is rotatable about the second axis O2. One of the first steel belts 71 and one of the second steel belts 72 are wounded around the first pulley 6C and the second pulley 6D in the same manner as the first pulley 6A and the second pulley 6B.

The first pulley 6E is connected to the upper end of the rotation shaft 55 and fitted around the fixed shaft 53, and is rotatable about the second axis O2. The second pulley 6F is connected to the lower end of the pivot shaft 57 and fitted around the fixed shaft 56, and is rotatable about the third axis O3. One of the first steel belts 71 and one of the second steel belts 72 are wounded around the first pulley 6E and the second pulley 6F in the same manner as the first pulley 6A and the second pulley 6B. When the rotation shaft 52 is rotated, the first pulley 6C, and the second pulley 6D, which is linked to the first pulley 6C via the first and the second steel belts 71 and 72, rotate. Also, when the second pulley 6D rotates, the first pulley 6E connected to the second pulley 6D via the rotation shaft 55 and the second pulley 6F linked to the first pulley 6E via the first and the second steel belts 71 and 72 rotate. As a result, the hand 4, which is connected to the second pulley 6F via the pivot shaft 57, pivots about the third axis O3.

Next, the first pulley 6A, the second pulley 6B, the first steel belt 71, the second steel belt 72, the first block member 81, the second block member 82, the third block member 83, the fourth block member 84, the first cover 91, the second cover 92, the third cover 93 and the fourth cover 94 will be described in detail with reference to FIGS. 4 to 7.

Figure 4:
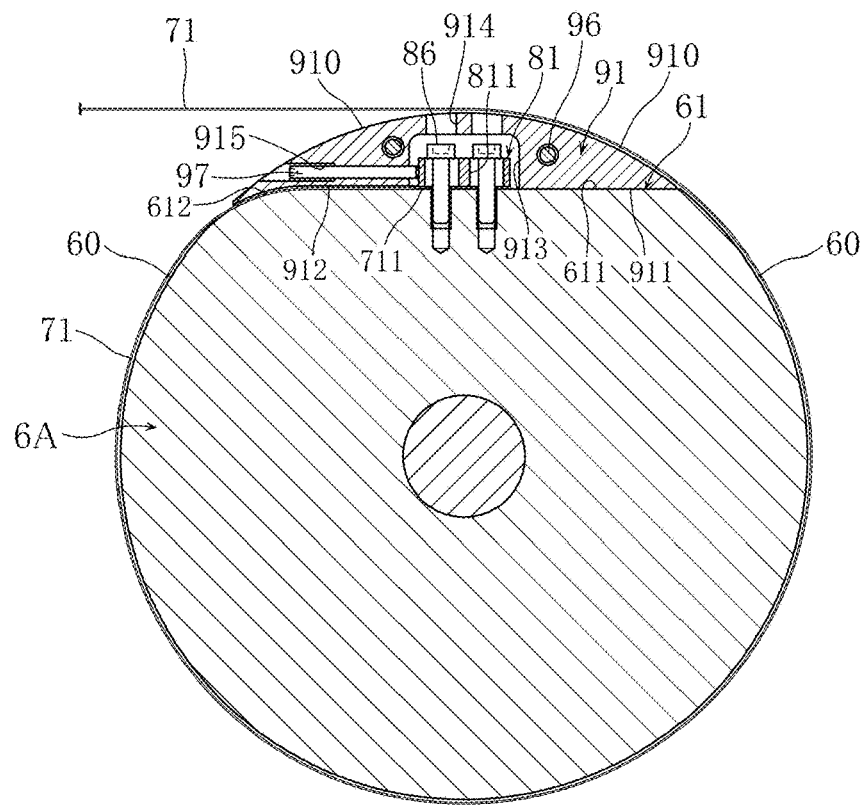
FIG. 4 is a partial sectional view taken along line IV-IV in FIG. 2.

As shown in FIG. 4, the first pulley 6A has a first recess 61. The first recess 61 is recessed from the outer circumferential surface 60 and the upper surface of the first pulley 6A and has a first surface 611 and a first guide surface 612. The first surface 611 is a flat surface which the contact surface 911 of the first cover 91, described later, comes into surface-contact with. The first guide surface 612 is a convex curved surface smoothly connected to the outer circumferential surface 60 of the first pulley 6A and the first surface 611.

The first block member 81 is fixed to the first end 711, which is one end of the first steel belt 71, by welding or other suitable means. The first block member 81 is formed with a pair of through-holes 811. The first end 711 is formed with through-holes at regions corresponding to the pair of through-holes 811. The through-holes 811 are elongated holes extending in the horizontal direction in FIG. 4. The first surface 611A of the first pulley 6A is formed with threaded holes, and mounting bolts 86 are fastened in the threaded holes through the through-holes 811. In this way, the first block member 81 is fixed to the first pulley 6A. The first steel belt 71 wound around the first pulley 6A is in contact with the outer circumferential surface 60, the first guide surface 612, and the first surface 611.

The first cover 91 is disposed in the first recess 61 and has a first outer circumferential surface 910, the contact surface 911, a retreated surface 912, a recess 913, and work holes 914 and 915. The contact surface 911 is in surface-contact with the first surface 611 of the first pulley 6A. The retreated surface 912 is a surface slightly retreated to the upper side in FIG. 4 from the contact surface 911. The distance by which the retreated surface 912 is retreated from the contact surface 911 is slightly larger than the thickness of the first steel belt 71. Thus, a portion of the first steel belt 71 that is located between the retreated surface 912 and the first guide surface 612 or the first surface 611 is slightly spaced apart from the retreated surface 912. The recess 913 is a portion recessed from the contact surface 911 to the upper side in FIG. 4. The first block member 81 is housed in the recess 913. The work holes 914 are through-holes extending from the first outer circumferential surface 910 to the recess 913 and used to operate the mounting bolts 86 from the outside with a tool. The work hole 915 is used to operate the adjustment screw 97, which is attached in a threaded hole in the first cover 91, from the outside. When the adjustment screw 97 is tightened, the first block member 81 is pushed toward the circumference of the first pulley 6A (to the right side in FIG. 4), increasing the tension of the first steel belt 71. By operating the adjustment screw 97 in this manner, the tension of the first steel belt 71 can be adjusted. The work hole 915 and the adjustment screw 97 are an example of the belt tension adjuster of the present disclosure. The first recess 61 of the first pulley 6A is formed with a threaded hole extending in the direction orthogonal to the sheet surface of FIG. 4, and a mounting bolt 96 is fastened in the threaded hole. In this way, the first cover 91 is fixed to the first pulley 6A to enclose the first block member 81.

The first outer circumferential surface 910 of the first cover 91 has the same diameter as the outer circumferential surface 60 of the first pulley 6A. Here, "the first outer circumferential surface 910 has the same diameter as the outer circumferential surface 60" means the following: the first outer circumferential surface 910 is in the form of an arc having the same radius of curvature as the outer circumferential surface 60; and when the first cover 91 is fixed to the first pulley 6A, the center of the radius of curvature of the first outer circumferential surface 910 coincides with the center of the outer circumferential surface 60 while the outer circumferential surface 60 and the first outer circumferential surface 910 form a continuous circumference with a predetermined diameter. Although the first outer circumferential surface 910 and the outer circumferential surface 60 are designed to have the same diameter, some error can occur when the first cover 91 is actually fixed to the first pulley 6A.

Figure 5:
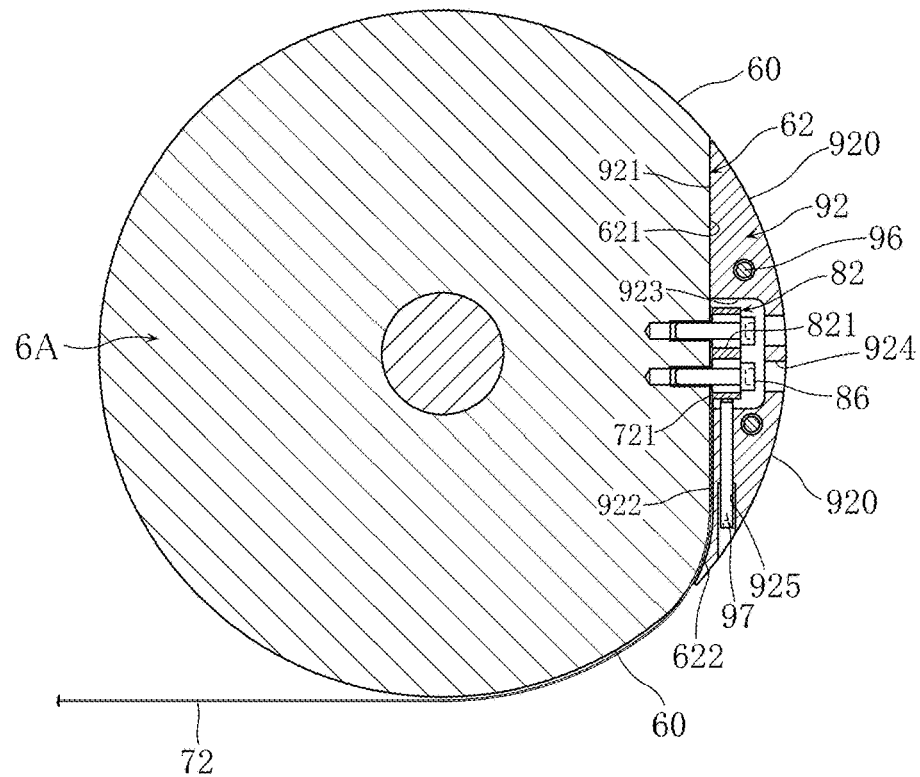
FIG. 5 is a partial sectional view taken along line V-V in FIG. 2.

As shown in FIG. 5, the first pulley 6A has a second recess 62. The second recess 62 is recessed from the outer circumferential surface 60 and the lower surface of the first pulley 6A and has a second surface 621 and a second guide surface 622. The second surface 621 is a flat surface which the contact surface 921 of the second cover 92, described later, comes into surface-contact with. The second guide surface 622 is a convex curved surface smoothly connected to the outer circumferential surface 60 of the first pulley 6A and the second surface 621.

The second block member 82 is fixed to the third end 721, which is one end of the second steel belt 72, by welding or other suitable means. The second block member 82 is formed with a pair of through-holes 821. The third end 721 is formed with through-holes at regions corresponding to the pair of through-holes 821. The through-holes 821 are elongated holes extending in the vertical direction in FIG. 5. The second surface 621 of the first pulley 6A is formed with threaded holes, and mounting bolts 86 are fastened in the threaded holes through the through-holes 821. In this way, the second block member 82 is fixed to the first pulley 6A. The second steel belt 72 wound around the first pulley 6A is in contact with the outer circumferential surface 60, the second guide surface 622, and the second surface 621.

The second cover 92 is disposed in the second recess 62 and has a second outer circumferential surface 920, the contact surface 921, a retreated surface 922, a recess 923, and work holes 924 and 925. The contact surface 921 is in surface-contact with the second surface 621 of the first pulley 6A. The retreated surface 922 is a surface slightly retreated to the right side in FIG. 5 from the contact surface 921. The distance by which the retreated surface 922 is retreated from the contact surface 921 is slightly larger than the thickness of the second steel belt 72. Thus, a portion of the second steel belt 72 that is located between the retreated surface 922 and the second guide surface 622 or the second surface 621 is slightly spaced apart from the retreated surface 922. The recess 923 is a portion recessed from the contact surface 921 to the right side in FIG. 5. The second block member 82 is housed in the recess 923. The work holes 924 are through-holes extending from the second outer circumferential surface 920 to the recess 923 and used to operate the mounting bolts 86 from the outside with a tool. The work hole 925 is used to operate the adjustment screw 97, which is attached in a threaded hole in the second cover 92, from the outside. When the adjustment screw 97 is tightened, the second block member 82 is pushed toward the circumference of the first pulley 6A (to the upper side in FIG. 4), increasing the tension of the second steel belt 72. By operating the adjustment screw 97 in this manner, the tension of the second steel belt 72 can be adjusted. The work hole 925 and the adjustment screw 97 are an example of the belt tension adjuster of the present disclosure. The second recess 62 of the first pulley 6A is formed with a threaded hole extending in the direction orthogonal to the sheet surface of FIG. 5, and a mounting bolt 96 is fastened in the threaded hole. In this way, the second cover 92 is fixed to the first pulley 6A to enclose the second block member 82.

The second outer circumferential surface 920 of the second cover 92 has the same diameter as the outer circumferential surface 60 of the first pulley 6A. Here, "the second outer circumferential surface 920 has the same diameter as the outer circumferential surface 60" means the following: the second outer circumferential surface 920 is in the form of an arc having the same radius of curvature as the outer circumferential surface 60; and when the second cover 92 is fixed to the first pulley 6A, the center of the radius of curvature of the second outer circumferential surface 920 coincides with the center of the outer circumferential surface 60 while the outer circumferential surface 60 and the second outer circumferential surface 920 form a continuous circumference with a predetermined diameter. Although the second outer circumferential surface 920 and the outer circumferential surface 60 are designed to have the same diameter, some error can occur when the second cover 92 is actually fixed to the first pulley 6A.

Figure 6:
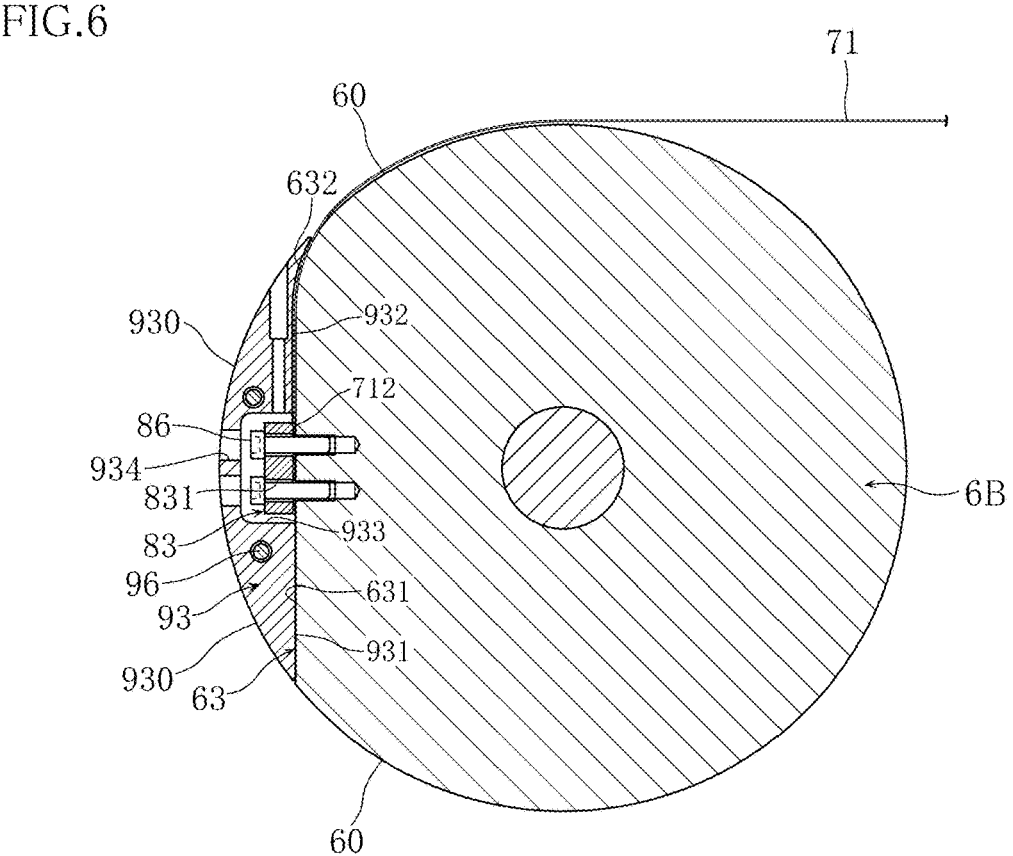
FIG. 6 is a partial sectional view taken along line VI-VI in FIG. 2.

As shown in FIG. 6, the second pulley 6B has a third recess 63. The third recess 63 is recessed from the outer circumferential surface 60 and the upper surface of the second pulley 6B and has a third surface 631 and a third guide surface 632. The third surface 631 is a flat surface which the contact surface 931 of the third cover 93, described later, comes into surface-contact with. The third guide surface 632 is a convex curved surface smoothly connected to the outer circumferential surface 60 of the second pulley 6B and the third surface 631.

The third block member 83 is fixed to the second end 712, which is the other end of the first steel belt 71, by welding or other suitable means. The third block member 83 is formed with a pair of through-holes 831. The second end 712 is formed with through-holes at regions corresponding to the pair of through-holes 831. The third surface 631 of the second pulley 6B is formed with threaded holes, and mounting bolts 86 are fastened in the threaded holes through the through-holes 831. In this way, the third block member 83 is fixed to the second pulley 6B. The first steel belt 71 wound around the second pulley 6B is in contact with the outer circumferential surface 60, the third guide surface 632, and the third surface 631.

The third cover 93 is disposed in the third recess 63 and has a third outer circumferential surface 930, the contact surface 931, a retreated surface 932, a recess 933, and work holes 934. The contact surface 931 is in surface-contact with the third surface 631 of the second pulley 6B. The retreated surface 932 is a surface slightly retreated to the left side in FIG. 6 from the contact surface 931. The distance by which the retreated surface 932 is retreated from the contact surface 931 is slightly larger than the thickness of the first steel belt 71. Thus, a portion of the first steel belt 71 that is located between the retreated surface 932 and the third guide surface 632 or the third surface 631 is slightly spaced apart from the retreated surface 932.

The recess 933 is a portion recessed from the contact surface 931 to the left side in FIG. 6. The third block member 83 is housed in the recess 933. The work holes 934 are through-holes extending from the third outer circumferential surface 930 to the recess 933 and used to operate the mounting bolts 86 from the outside with a tool. The third recess 63 of the second pulley 6B is formed with a threaded hole extending in the direction orthogonal to the sheet surface of FIG. 6, and a mounting bolt 96 is fastened in the threaded hole. In this way, the third cover 93 is fixed to the second pulley 6B to enclose the third block member 83.

The third outer circumferential surface 930 of the third cover 93 has the same diameter as the outer circumferential surface 60 of the second pulley 6B. Here, "the third outer circumferential surface 930 has the same diameter as the outer circumferential surface 60" means the following: the third outer circumferential surface 930 is in the form of an arc having the same radius of curvature as the outer circumferential surface 60; and when the third cover 93 is fixed to the second pulley 6B, the center of the radius of curvature of the third outer circumferential surface 930 coincides with the center of the outer circumferential surface 60 while the outer circumferential surface 60 and the third outer circumferential surface 930 form a continuous circumference with a predetermined diameter. Although the third outer circumferential surface 930 and the outer circumferential surface 60 are designed to have the same diameter, some error can occur when the third cover 93 is actually fixed to the second pulley 6B.

Figure 7:
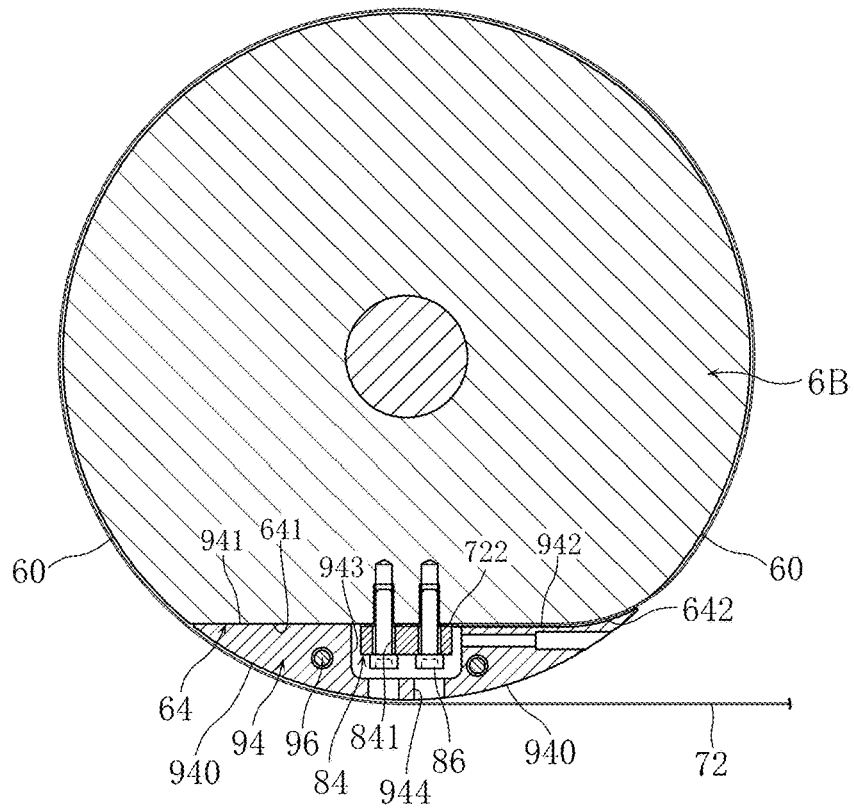
FIG. 7 is a partial sectional view taken along line VII-VII in FIG. 2.

As shown in FIG. 7, the second pulley 6B has a fourth recess 64. The fourth recess 64 is recessed from the outer circumferential surface 60 and the lower surface of the second pulley 6B and has a fourth surface 641 and a fourth guide surface 642. The fourth surface 641 is a flat surface which the contact surface 941 of the fourth cover 94, described later, comes into surface-contact with. The fourth guide surface 642 is a convex curved surface smoothly connected to the outer circumferential surface 60 of the second pulley 6B and the fourth surface 641.

The fourth block member 84 is fixed to the fourth end 722, which is the other end of the second steel belt 72, by welding or other suitable means. The fourth block member 84 is formed with a pair of through-holes 841. The fourth end 722 is formed with through-holes at regions corresponding to the pair of through-holes 841. The fourth surface 641 of the second pulley 6B is formed with threaded holes, and mounting bolts 86 are fastened in the threaded holes through the through-holes 841. In this way, the fourth block member 84 is fixed to the second pulley 6B. The second steel belt 72 wound around the second pulley 6B is in contact with the outer circumferential surface 60, the fourth guide surface 642, and the fourth surface 641.

The fourth cover 94 is disposed in the fourth recess 64 and has a fourth outer circumferential surface 940, the contact surface 941, a retreated surface 942, a recess 943, and work holes 944. The contact surface 941 is in surface-contact with the fourth surface 641 of the second pulley 6B. The retreated surface 942 is slightly retreated to the lower side in FIG. 7 from the contact surface 941. The distance by which the retreated surface 942 is retreated from the contact surface 941 is slightly larger than the thickness of the second steel belt 72. Thus, a portion of the second steel belt 72 that is located between the retreated surface 942 and the fourth guide surface 642 or the fourth surface 641 is slightly spaced apart from the retreated surface 942. The recess 943 is a portion recessed from the contact surface 941 to the lower side in FIG. 7. The fourth block member 84 is housed in the recess 943. The work holes 944 are through-holes extending from the fourth outer circumferential surface 940 to the recess 943 and used to operate the mounting bolts 86 from the outside with a tool. The fourth recess 64 of the second pulley 6B is formed with a threaded hole extending in the direction orthogonal to the sheet surface of FIG. 7, and a mounting bolt 96 is fastened in the threaded hole. In this way, the fourth cover 94 is fixed to the second pulley 6B to enclose the fourth block member 84.

The fourth outer circumferential surface 940 of the fourth cover 94 has the same diameter as the outer circumferential surface 60 of the second pulley 6B. Here, "the fourth outer circumferential surface 940 has the same diameter as the outer circumferential surface 60" means the following: the fourth outer circumferential surface 940 is in the form of an arc having the same radius of curvature as the outer circumferential surface 60; and when the fourth cover 94 is fixed to the second pulley 6B, the center of the radius of curvature of the fourth outer circumferential surface 940 coincides with the center of the outer circumferential surface 60 while the outer circumferential surface 60 and the fourth outer circumferential surface 940 form a continuous circumference with a predetermined diameter. Although the fourth outer circumferential surface 940 and the outer circumferential surface 60 are designed to have the same diameter, some error can occur when the fourth cover 94 is actually fixed to the second pulley 6B.

FIG. 8 are plan views schematically illustrating the first pulley 6A and the second pulley 6B in a state most rotated in one rotation direction and in a state most rotated in the opposite rotation direction. In FIGS. 8, the second steel belt 72 is shown by a dotted line to be distinguishable from the first steel belt 71.

Figure 8A:
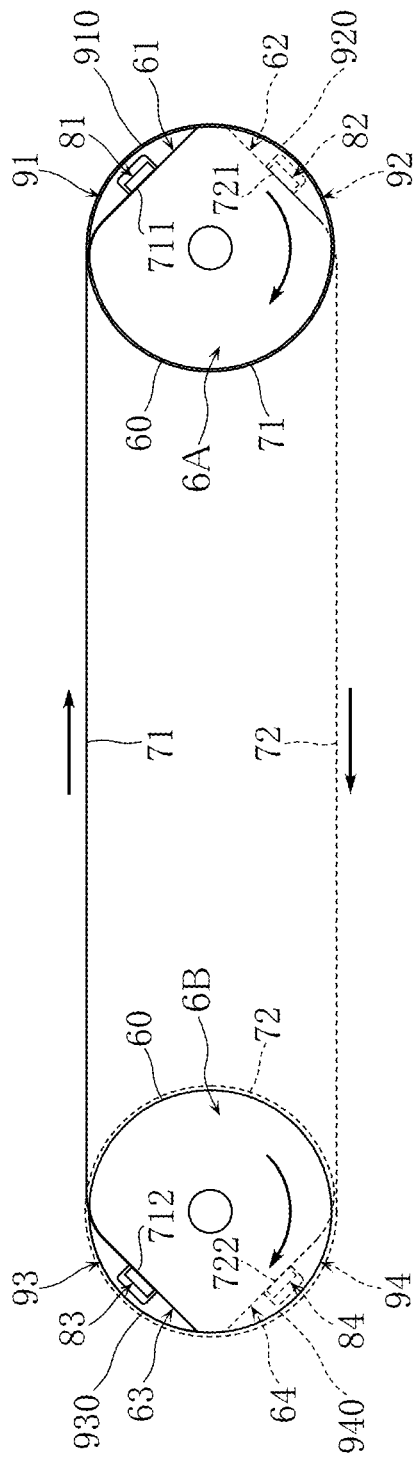
FIGS. 8A and 8B are schematic plan views showing a first pulley and a second pulley in a state most rotated in one direction and in a state most rotated in the opposite direction, respectively.

As shown in FIG. 8A, when the first pulley 6A and the second pulley 6B are most rotated in one rotation direction, the first steel belt 71 is wound around the outer circumferential surface 60 of the first pulley 6A and the first outer circumferential surface 910 of the first cover 91 to make almost a full turn (approximately 360°) in the circumferential direction of the first pulley 6A. Further, the second steel belt 72 is wound around the outer circumferential surface 60 of the second pulley 6B and the fourth outer circumferential surface 940 of the fourth cover 94 to make almost a full turn (approximately 360°) in the circumferential direction of the second pulley 6B.

Figure 8B:
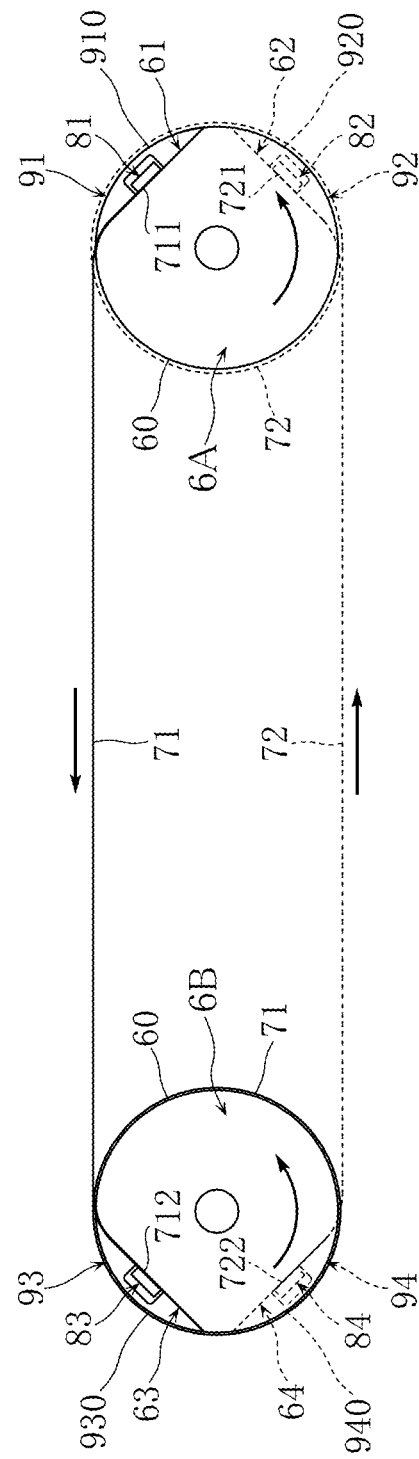

As shown in FIG. 8B, when the first pulley 6A and the second pulley 6B are most rotated in the opposite rotation direction, the first steel belt 71 is wound around the outer circumferential surface 60 of the second pulley 6B and the third outer circumferential surface 930 of the third cover 93 to make almost a full turn (approximately 360°) in the circumferential direction of the second pulley 6B. Further, the second steel belt 72 is wound around the outer circumferential surface 60 of the first pulley 6A and the second outer circumferential surface 920 of the second cover 92 to make almost a full turn (approximately 360°) in the circumferential direction of the first pulley 6A. As will be understood from the above, the rotation angle of the first pulley 6A and the second pulley 6B is approximately 360° in the present embodiment.

The configurations of the first pulley 6C and the second pulley 6D shown in FIG. 2 are the same as those of the first pulley 6A and the second pulley 6B. The first pulley 6C and the second pulley 6D also have a first steel belt 71 and a second steel belt 72 wounded around them. The attachment structure of the first steel belt 71 and the second steel belt 72 to the first pulley 6C and the second pulley 6D is also the same as that for the first pulley 6A and the second pulley 6B described above. The first steel belt 71 and the second steel belt 72 are fixed to the first pulley 6C and the second pulley 6D by using a first through a fourth block members 81 to 84. Also, the first pulley 6C has a first cover 91 and a second cover 92 attached to it in the same manner as the first pulley 6A, and the second pulley 6D has a third cover 93 and a fourth cover 94 attached to it in the same manner as the second pulley 6B. The rotation angle of the first pulley 6C and the second pulley 6D is approximately 360° as with the first pulley 6A and the second pulley 6B.

The configurations of the first pulley 6E and the second pulley 6F shown in FIG. 2 are the same as those of the first pulley 6A and the second pulley 6B. The first pulley 6E and the second pulley 6F also have a first steel belt 71 and a second steel belt 72 wounded around them. The attachment structure of the first steel belt 71 and the second steel belt 72 to the first pulley 6E and the second pulley 6F is also the same as that for the first pulley 6A and the second pulley 6B described above. The first steel belt 71 and the second steel belt 72 are fixed to the first pulley 6E and the second pulley 6F by using a first through a fourth block members 81 to 84. Also, the first pulley 6E has a first cover 91 and a second cover 92 attached to it in the same manner as the first pulley 6A, and the second pulley 6F has a third cover 93 and a fourth cover 94 attached to it in the same manner as the second pulley 6B. The rotation angle of the first pulley 6E and the second pulley 6F is approximately 360° as with the first pulley 6A and the second pulley 6B.

Next, the effects of the present embodiment will be described.

In the transfer robot A1, the first steel belt 71 and the second steel belt 72 are wound around the first pulley 6A

(6C, 6E) and the second pulley 6B (6D, 6F). The first steel belt 71 and the second steel belt 72 are each a belt with two ends. The second steel belt 72 is spaced apart from the first steel belt 71 in the axial direction (the vertical direction) of the first pulley 6A (6C, 6E) and the second pulley 6B (6D, 6F). The second steel belt 72 is wound around the first pulley 6A (6C, 6E) and the second pulley 6B (6D, 6F) with its winding direction opposite from that of the first steel belt 71.

The first pulley 6A (6C, 6E) has the first recess 61 and the second recess 62 each recessed from the outer circumferential surface 60. To the first end 711, which is one end of the first steel belt 71, is fixed the first block member 81, and the first block member 81 is disposed in the first recess 61. The first cover 91 is fixed to the first recess 61 to enclose the first block member 81. The first cover 91 has the first outer circumferential surface 910 that has the same diameter as the outer circumferential surface 60 of the first pulley 6A (6C, 6E). To the third end 721, which is one end of the second steel belt 72, is fixed the second block member 82, and the second block member 82 is disposed in the second recess 62. The second cover 92 is fixed to the second recess 62 to enclose the second block member 82. The second cover 92 has the second outer circumferential surface 920 that has the same diameter as the outer circumferential surface 60 of the first pulley 6A (6C, 6E). Such a configuration makes it possible to wind the first steel belt 71 around the first outer circumferential surface 910 of the first cover 91, which is fixed to enclose the first block member 81, without interfering with the first block member 81, which is the part where the first steel belt 71 is fixed to the first pulley 6A (6C, 6E). The above configuration also makes it possible to wind the second steel belt 72 around the second outer circumferential surface 920 of the second cover 92, which is fixed to enclose the second block member 82, without interfering with the second block member 82, which is the part where the second steel belt 72 is fixed to the first pulley 6A (6C, 6E). Therefore, the first steel belt 71 (the second steel belt 72) can be wound around the first pulley 6A (6C, 6E) to make almost a full turn (approximately 360°) in the circumferential direction of the first pulley 6A over the outer circumferential surface 60 of the first pulley 6A (6C, 6E) and the first outer circumferential surface 910 (the second outer circumferential surface 920) of the first cover 91 (the second cover 92). Thus, the rotation angle of the first pulley 6A (6C, 6E) can be increased.

The second pulley 6B (6D, 6F) has the third recess 63 and the fourth recess 64 each recessed from the outer circumferential surface 60. To the second end 712, which is the other end of the first steel belt 71, is fixed the third block member 83, and the third block member 83 is disposed in the third recess 63. The third cover 93 is fixed to the third recess 63 to enclose the third block member 83. The third cover 93 has the third outer circumferential surface 930 that has the same diameter as the outer circumferential surface 60 of the second pulley 6B (6D, 6F). To the fourth end 722, which is the other end of the second steel belt 72, is fixed the fourth block member 84, and the fourth block member 84 is disposed in the fourth recess 64. The fourth cover 94 is fixed to the fourth recess 64 to enclose the fourth block member 84. The has the fourth cover 94 fourth outer circumferential surface 940 that has the same diameter as the outer circumferential surface 60 of the second pulley 6B (6D, 6F). Such a configuration makes it possible to wind the first steel belt 71 around the third outer circumferential surface 930 of the third cover 93, which is fixed to enclose the third block member 83, without interfering with the third block member 83, which is the part where the first steel belt 71 is fixed to the second pulley 6B (6D, 6F). The above configuration also makes it possible to wind the second steel belt 72 around d the fourth outer circumferential surface 940 of the fourth cover 94, which is fixed to enclose the fourth block member 84, without interfering with the fourth block member 84, which is the part where the second steel belt 72 is fixed to the second pulley 6B (6D, 6F). Therefore, the first steel belt 71 (the second steel belt 72) can be wound around the second pulley 6B (6D, 6F) to make almost a full turn (approximately 360°) in the circumferential direction of the second pulley 6B (6D, 6F) over the outer circumferential surface 60 of the second pulley 6B (6D, 6F) and the third outer circumferential surface 930 (the fourth outer circumferential surface 940) of the third cover 93 (the fourth cover 94). As described above, the first steel belt 71 (the second steel belt 72) can be wound around the first pulley 6A (6C, 6E) to make almost a full turn (approximately 360°) in the circumferential direction of the first pulley 6A over the outer circumferential surface 60 of the first pulley 6A (6C, 6E) and the first outer circumferential surface 910 (the second outer circumferential surface 920) of the first cover 91 (the second cover 92). Therefore, the rotation angle of the first pulley 6A and the second pulley 6B is approximately 360°. In the conventional configuration (the configuration shown in FIG. 3 of JP-A-2008-223974), the rotation angle of the pulleys is approximately 300°. Thus, the present embodiment can increase the rotation angle of the first pulley 6A (6C, 6E) and the second pulley 6B (6D, 6F).

The first cover 91 is provided with the adjustment screw 97 (belt tension adjuster) capable of pushing the first block member 81 toward the circumference of the first pulley 6A (6C, 6E). The second cover 92 is provided with the adjustment screw 97 (belt tension adjuster) capable of pushing the second block member 82 toward the circumference of the first pulley 6A (6C, 6E). With such a configuration, when a plurality of first pulleys, such as pulleys 6A and 6C, are aligned along the first axis O1 as shown in FIG. 2, the adjustment screws 97 can be easily adjusted from the outside, which facilitates adjustment of the tension of the first steel belt 71 and the second steel belt 72. Unlike the present embodiment, only one of the first cover 91 and the second cover 92 may be provided with the adjustment screw 97. In such a case again, the tension of the first steel belt 71 and the second steel belt 72, which are attached with their winding directions opposite to each other, can be adjusted by operating the adjustment screws 97.

The first recess 61 of the first pulley 6A (6C, 6E) has the first guide surface 612. The first guide surface 612 smoothly connects to the outer circumferential surface 60 of the first pulley 6A and is in contact with the first steel belt 71. The second recess 62 of the first pulley 6A (6C, 6E) has the second guide surface 622. The second guide surface 622 smoothly connects to the outer circumferential surface 60 of the first pulley 6A and is in contact with the second steel belt 72. This configuration prevents unbalanced loads on the first steel belt 71 and the second steel belt 72 wound around the first pulley 6A (6C, 6E), allowing the first pulley 6A (6C, 6E) to rotate smoothly. In the present embodiment, the second pulley 6B (6D, 6F) is also formed with the third guide surface 632 and the fourth guide surface 642 that are similar to the first guide surface 612 and the second guide surface 622 of the first pulley 6A (6C, 6E). This prevents unbalanced loads on the first steel belt 71 and the second steel belt 72 wound around the second pulley 6B (6D, 6F), allowing the second pulley 6B (6D, 6F) to rotate smoothly.

The belt transmission mechanism of the present disclosure is not limited to the above embodiment. Various modifications in design may be made freely in the specific structure of the transfer apparatus according to the present disclosure.

REFERENCE NUMERALS

A1: Transfer robot 2: First arm 3: Second arm
6A, 6C, 6E: First pulley 6B, 6D, 6F: Second pulley
60: Outer circumferential surface
61: First recess 612: First guide surface
62: Second recess 622: Second guide surface
63: Third recess 64: Fourth recess
71: First steel belt 711: First end 712: Second end
72: Second steel belt 721: Third end 722: Fourth end
81: First block member 82: Second block member
83: Third block member 84: Fourth block member
91: First cover 910: First outer circumferential surface
92: Second cover 920: Second outer circumferential surface
93: Third cover 930: Third outer circumferential surface
94: Fourth cover 940: Fourth outer circumferential surface
97: Adjustment screw (Belt tension adjuster)
O1: First axis O2: Second axis O3: Third axis

The invention claimed is:

1. A belt transmission mechanism comprising:
a first pulley and a second pulley disposed rotatably about a pair of axes that are parallel to each other;
a first steel belt including a first end attached to the first pulley and a second end attached to the second pulley and wound around the first pulley and the second pulley;
a second steel belt including a third end attached to the first pulley and a fourth end attached to the second pulley, the second steel belt being spaced apart from the first steel belt in an axial direction of the first pulley and the second pulley, and wound around the first pulley and the second pulley with a winding direction thereof opposite from a winding direction of the first steel belt;
a first cover; and
a second cover; wherein
the first pulley includes a first recess and a second recess that are recessed from an outer circumferential surface thereof,
a first block member is fixed to the first end, the first block member being disposed in the first recess,
the first cover is fixed to the first recess to enclose the first block member and includes a first outer circumferential surface having a same diameter as the outer circumferential surface of the first pulley,
a second block member is fixed to the third end, the second block member being disposed in the second recess,
the second cover is fixed to the second recess to enclose the second block member and includes a second outer circumferential surface having a same diameter as the outer circumferential surface of the first pulley, and
at least one of the first cover and the second cover is provided with a belt tension adjuster capable of pushing a corresponding one of the first block member and the second block member toward a circumference of the first pulley.

2. The belt transmission mechanism according to claim 1, further comprising a third cover and a fourth cover, wherein
the second pulley includes a third recess and a fourth recess that are recessed from an outer circumferential surface thereof,
a third block member is fixed to the second end, the third block member being disposed in the third recess,
the third cover is fixed to the third recess to enclose the third block member and includes a third outer circumferential surface having a same diameter as the outer circumferential surface of the second pulley,
a fourth block member is fixed to the fourth end, the fourth block member being disposed in the fourth recess, and
the fourth cover is fixed to the fourth recess to enclose the fourth block member and includes a fourth outer circumferential surface having a same diameter as the outer circumferential surface of the second pulley.

3. The belt transmission mechanism according to claim 1, wherein
the first recess includes a first convex curved guide surface that is in contact with the first steel belt and connected to the outer circumferential surface of the first pulley, and
the second recess includes a second convex curved guide surface that is in contact with the second steel belt and connected to the outer circumferential surface of the first pulley.

4. A transfer robot comprising:
the belt transmission mechanism as set forth in claim 1; and
a horizontal articulated arm mechanism including an arm configured to be pivoted by the belt transmission mechanism.

* * * * *